S. P. FORCIER.
PLANTER.
APPLICATION FILED MAR. 19, 1908.
901,235.
Patented Oct. 13, 1908.
3 SHEETS—SHEET 3.
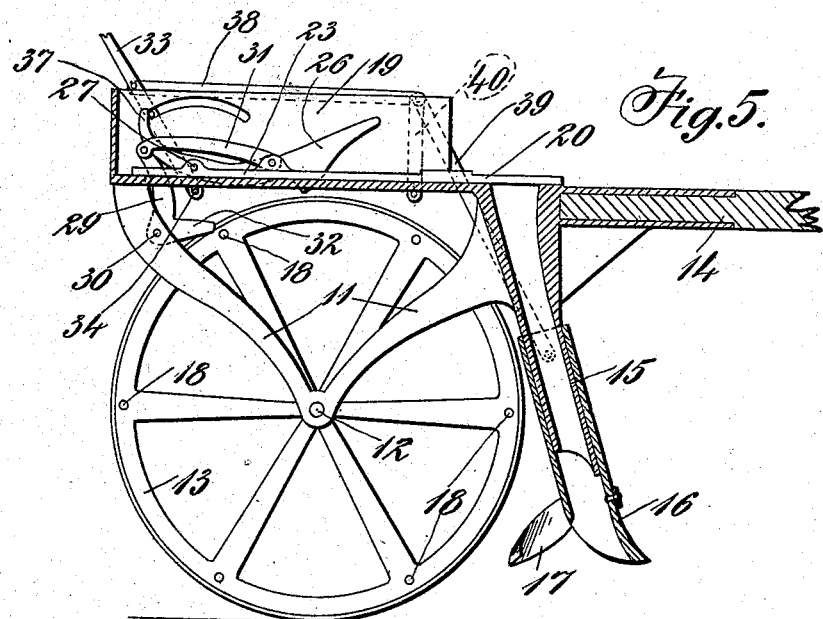
Fig. 5.
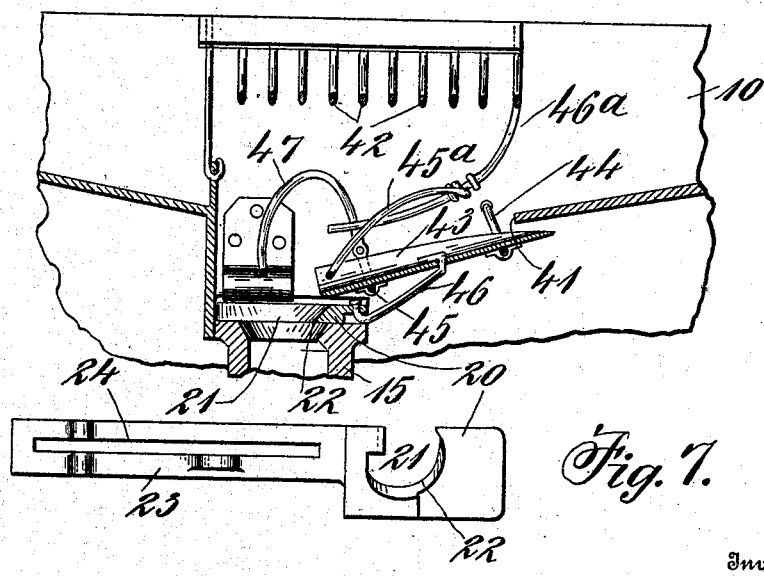
Fig. 6.
Fig. 7.

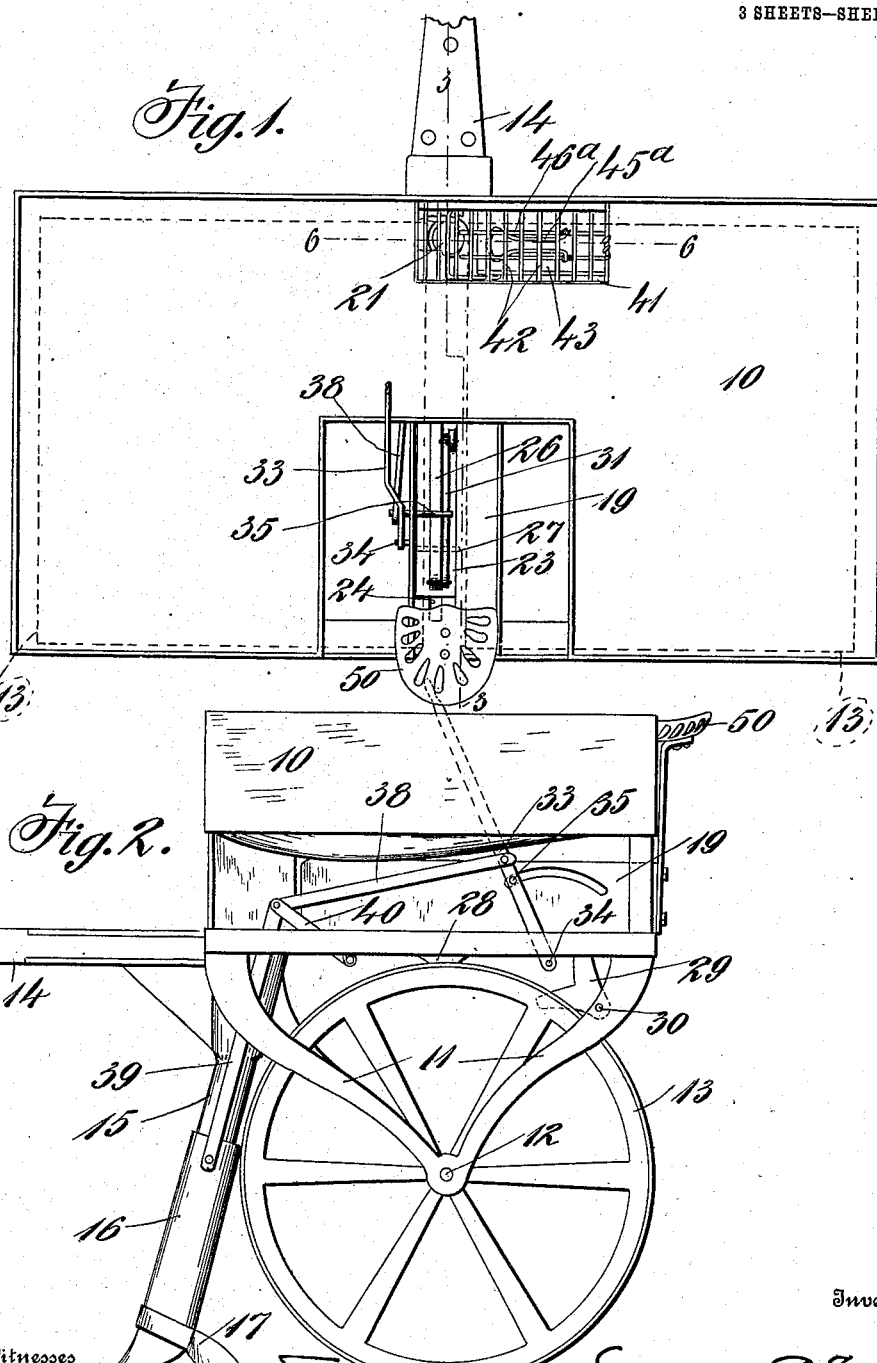

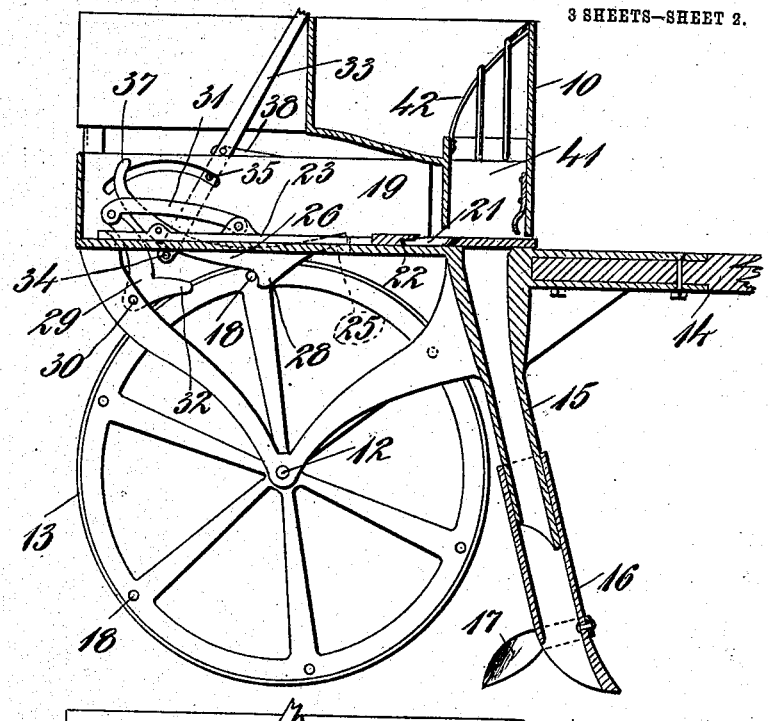
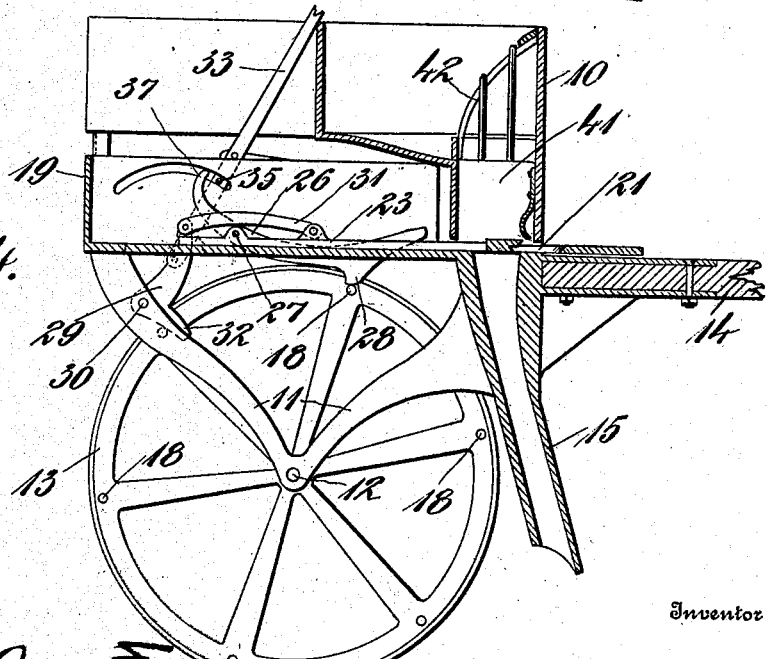

UNITED STATES PATENT OFFICE.

SOUVERAN P. FORCIER, OF DETROIT, MICHIGAN.

PLANTER.

No. 901,235.  Specification of Letters Patent.  Patented Oct. 13, 1908.

Application filed March 19, 1908. Serial No. 422,170.

*To all whom it may concern:*

Be it known that I, SOUVERAN P. FORCIER, a citizen of the United States, residing at Detroit, in the county of Wayne and State of Michigan, have invented certain new and useful Improvements in Planters, of which the following is a specification.

This invention is a planter particularly adapted to plant potatoes, and comprises means for making the furrow, for cutting and feeding the potatoes, and for covering and rolling the same, as hereinafter more fully described.

The invention is illustrated in the accompanying drawings, in which—

Figure 1 is a top plan view of the machine. Fig. 2 is a side elevation. Fig. 3 is a vertical section on the line 3—3 of Fig. 1, showing particularly the cutting devices, with said devices in one position. Fig. 4 is a similar view with the cutting devices in another position. Fig. 5 is a detail showing the same parts, but with the cutting device thrown out of operation. Fig. 6 is a section on the line 6—6 of Fig. 1, showing particularly the feeding devices. Fig. 7 is a plan view of the cutting knife.

Referring specifically to the drawings, 10 indicates a seed box mounted upon a frame 11 carried upon an axle 12 on which turns a pair of rollers or wheels 13 which are spaced apart slightly at the middle of the machine. A tongue 14 is connected to the front of the frame, and said frame also supports, at the middle thereof, a feeding tube 15 which terminates in a shoe or furrow opener 16 the upper part of which is sleeved over the tube 15 and which is slidable up and down thereon. The shoe has wings 17 projecting laterally and rearwardly therefrom and properly shaped to cover the seed deposited in the furrow from the tube.

One of the rollers or wheels has at its inner end, at the periphery thereof, a series of laterally projecting pins 18 which are placed apart at equal distances around the roller or wheel. These pins operate the feeding devices and their number may be varied as desired, according to the rate of feed desired. 19 is a box or casing which extends from front to rear across the frame at the middle thereof, and under the seed box, and the tube 15 opens at the top through the floor of this casing at the front end thereof. Slidably mounted upon the floor or bottom of the casing, and adapted to reciprocate above the top of the tube 15, is a cutter 20 having an opening 21 which when the knife is moved opens and closes the entrance to the tube 15. The cutter has cutting edges 22 on opposite sides of said opening, so as to cut each way, as the cutter is reciprocated.

The cutter has a rearwardly extending arm 23 which is slotted as at 24, and said slot registers with a slot 25 in the bottom or floor of the box 19. Said arm carries two pawls which work through said slots, one pawl giving the forward motion to the knife and the other giving the backward motion. The former is indicated at 26 and is pivoted to the sliding arm at 27, and has a downwardly extending projection 28 which normally hangs down in position to be engaged by one of the pins 18. When so engaged, the slide is carried forward until the pin 18, in consequence of the turn of the roller or wheel, slips off the projection 28. The pawl for returning the slide is indicated at 29. It is pivoted at 30 to the frame 11 and is connected at its upper end to the slide by a link 31. It has a depending projection 32 which when the slide is advanced, swings down in the path of the pins 18. The pawls are so arranged and located that the front pawl 26 leaves its pin 18 just as the rear pawl 29 is engaged by the succeeding pin.

To throw the pawls out of action and stop the feed, a hand lever 33 is provided. This is fulcrumed at 34 on the side of the casing 19 and has a pin 35 which projects through a curved slot in the side of the box in a position to engage the upturned tail 37 of the pawl 26. When said lever is pulled back the front end of the pawl is raised so that it will miss the pins 18 and the sliding cutter is also pulled back, which turns up the pawl 29 so that its projection 32 is also out of the path of the pins 18. The roller or wheel can thus revolve without operating the pawls. The lever 33 is also connected by links 38 and 39 to the furrow opener or shoe 16, said links having a bell crank action by means of a fulcrum link 40, and when the lever 33 is thrown back the furrow opener or shoe 16 is pulled up out of the ground, so that the machine may be turned around or otherwise controlled with the planting parts inactive.

In order to feed the potatoes to the cutter, the bottom of the feed box is provided with an opening 41 covered except on one side by a grating 42. A feed plate 43 (see Fig. 6) vibrates under the opening in the feed box with its lower end in proximity to the opening in the cutter. Said feed plate is hung at the upper end by a swinging hanger 44 and at the lower end by a swinging hanger 45, and it is connected by a swinging pitman 46 to the cutter 20, and as said cutter reciprocates the feed plate vibrates and feeds the potatoes down onto the cutter. In order to prevent more than one potato feeding at a time, a gravity detent $45^a$ is provided, hung from rods $46^a$ above the vibrating plate, and there is also provided a curved cutoff device 47 which is attached to the hanger 45 and which swings up and down as said hanger vibrates, allowing one potato to pass or drop off the lower end of the feed plate at each vibration thereof.

By the means stated the potatoes are fed one by one onto the cutter and just as they fall into the hole therein the advance of the cutter slices off a part which drops into the feed tube. The remainder of the potato rests upon the cutter plate until the backward stroke thereof, when it drops into the hole therein and is again cut by the cutting edge on the opposite side, the remaining piece being fed down on the next forward stroke of the cutter. Each potato is thus cut in three pieces, each of which may reasonably be expected to contain one or more eyes. The pieces feed down through the spout 15 into the furrow made by the furrow-opener or shoe 16 after which they are covered by the wings 17 and the rollers or wheels 13 following press the ground around the seed.

The whole machine may be operated by one man, a seat 50 being conveniently provided at the rear. When turning at corners or at the end of the rows, or when transporting the machine over hard ground, the planting devices may be thrown out of operation by manipulation of the lever 33 in the manner above described.

I claim:

1. In a planter, the combination of a seed box supported on rollers and provided with a feeding spout, a shoe slidable up and down on the lower end of the spout, means including a pawl actuated by a roller to feed seed from the box to the spout, and means to simultaneously render said means inoperative and to lift the shoe from the ground comprising a lever connected to the shoe and having a projection engageable with the pawl to move the same to inoperative position.

2. In a planter, the combination of a seed box and frame, rollers supporting the same, one of the rollers having projecting pins, a feeding spout leading from the box to the ground, a cutter movable back and forth across the top of the spout, and alternately-acting pawls connected to the cutter and projecting into the path of the pins, one pawl being constructed to advance the cutter when struck by the pins and the other to retract the same.

3. In a planter, the combination of a frame and seed box and a feeding spout extending downwardly therefrom and rollers on which the box is supported, one of the rollers having projections, a reciprocating cutter working across the top of the spout, a pawl to advance the cutter pivotally connected thereto and having a projection depending into the path of the projections on the roller, and a pawl to retract the cutter, pivoted on the frame and connected to the cutter and having a projection which extends into the path of the projections on the roller when the cutter is advanced, said pawls being arranged to operate in alternation.

4. In a planter, the combination of a seed box having an opening in the bottom and a feeding spout leading therefrom, a reciprocating cutter over the top of the spout, a vibrating feed plate located under said opening and over the cutter and arranged to vibrate laterally with respect to the cutter, a cutoff movable above the plate to produce an intermittent feed, and operating connections between the cutter, the feed plate and the cut off.

5. In a planter, the combination of the frame, seed box and spout leading therefrom, a roller supporting the box and having projecting pins, a reciprocating cutter movable across the top of the spout and having an opening through which the seed falls from the box into the spout as the cutter is reciprocated, an advancing pawl pivoted to the cutter and depending at its front end into the path of the pins and having an upturned tail, a retracting pawl pivoted on the frame and having a projection which extends into the path of the pins when the cutter is advanced, and a lever having an arm arranged to strike the said tail of the pawl and lift the pawl from the path of the pins and to retract the cutter.

6. In a planter, the combination of a seed box having an opening in the bottom and a spout leading therefrom, a reciprocating cutter slidable over the spout and having an opening through which seed passes into the spout, an inclined feed plate having hangers at opposite ends and arranged to swing under said opening and at an angle to the line of reciprocation of the cutter, means to operate the cutter, and operative connections between the cutter and the feed plate.

In testimony whereof I affix my signature, in presence of two witnesses.

SOUVERAN P. FORCIER.

Witnesses:
GEORGE McELVERN,
JOHN McLEOD.